United States Patent
Yoon

(10) Patent No.: US 7,565,895 B2
(45) Date of Patent: Jul. 28, 2009

(54) METHOD AND SYSTEM OF CONTROLLING SWIRL CONTROL VALVE

(75) Inventor: Sung-Il Yoon, Seoul (KR)

(73) Assignee: Hyundai Motor Company, Seoul (KR)

( * ) Notice: Subject to any disclaimer, the term of this patent is extended or adjusted under 35 U.S.C. 154(b) by 152 days.

(21) Appl. No.: 11/648,887

(22) Filed: Dec. 29, 2006

(65) Prior Publication Data

US 2008/0053089 A1  Mar. 6, 2008

(30) Foreign Application Priority Data

Aug. 31, 2006  (KR) ............... 10-2006-0083626

(51) Int. Cl.
- F02B 31/00 (2006.01)
- F02P 5/00 (2006.01)
- F02M 51/00 (2006.01)
- F02M 25/07 (2006.01)
- F02B 31/06 (2006.01)

(52) U.S. Cl. ............... 123/308; 123/480; 123/406.11; 123/568.12; 60/605.2; 60/602

(58) Field of Classification Search ............... 123/480, 123/21, 406.11, 306–308, 568.11, 568.12; 60/605.2, 600–603; F02B 31/00, 31/06

See application file for complete search history.

(56) References Cited

U.S. PATENT DOCUMENTS

| 4,174,686 A | * | 11/1979 | Shimizu et al. ............... 123/308 |
| 4,462,349 A | * | 7/1984 | Motosugi et al. ............. 123/308 |
| 5,226,351 A | * | 7/1993 | Matsuoka et al. ............. 477/32 |
| 5,592,917 A | * | 1/1997 | Kim ........................... 123/308 |
| 6,289,883 B1 | * | 9/2001 | Wakutani et al. ....... 123/568.12 |
| 6,612,292 B2 | * | 9/2003 | Shirakawa ................. 123/501 |
| 6,814,059 B2 | * | 11/2004 | Ito et al. ..................... 123/464 |
| 6,968,825 B2 | * | 11/2005 | Hitomi et al. .......... 123/406.11 |
| 6,973,785 B2 | * | 12/2005 | Umehara et al. ........... 60/605.2 |
| 7,017,539 B2 | * | 3/2006 | Lewis et al. .............. 123/90.15 |
| 7,028,650 B2 | * | 4/2006 | Lewis et al. ................. 123/308 |
| 7,107,978 B2 | * | 9/2006 | Itoyama ................. 123/568.11 |
| 7,163,007 B2 | * | 1/2007 | Sasaki et al. ................. 123/480 |
| 7,167,790 B2 | * | 1/2007 | Kikutani ................ 123/568.11 |
| 7,255,066 B2 | * | 8/2007 | Lewis et al. .................... 123/21 |
| 7,322,194 B2 | * | 1/2008 | Sun et al. .................... 60/605.2 |
| 2008/0234917 A1 | * | 9/2008 | Hatano et al. ............... 701/103 |

FOREIGN PATENT DOCUMENTS

| JP | 2002-371856 | 12/2002 |
| JP | 2004-293476 | 10/2004 |
| KR | 10-2005-0068445 | 7/2005 |

* cited by examiner

*Primary Examiner*—Thai Ba Trieu
(74) *Attorney, Agent, or Firm*—Morgan, Lewis & Bockius LLP

(57) ABSTRACT

A method and system of controlling a swirl control valve includes determining whether a current condition is in Tip Out by detecting positions of VGT vanes and an EGR valve, fully opening the swirl control valve if the current condition is in Tip Out, and not opening the swirl control valve if the current condition is not in Tip Out.

7 Claims, 6 Drawing Sheets

SCV VALVE OPEN IN TIP OUT

SCV VALVE OPEN IN TIP OUT

<Tangential PORT>  <Helical PORT>

IN SCV FULL CLOSED

IN SCV FULL OPEN

METHOD AND SYSTEM OF CONTROLLING SWIRL CONTROL VALVE

CROSS-REFERENCE TO RELATED APPLICATIONS

The present application is based on, and claims priority from, Korean Application Serial Number 10-2006-0083626, filed on Aug. 31, 2006, the disclosure of which is hereby incorporated by reference herein in its entirety.

FIELD OF THE INVENTION

The present invention relates to a method of controlling a swirl control valve, and particularly to a method of controlling a swirl control valve for reducing surge noise created in Tip Out in a swirl control valve system for a diesel vehicle having a four-valve diesel engine.

BACKGROUND OF THE INVENTION

In a diesel engine, turbo surge occurs when intake air is not moving fast enough to overcome surface friction in a turbo compressor. During turbo surge, air flows backward and swirls with intake air, which results in noise and vibrations.

A swirl control valve system is applied to most common diesel vehicles. The swirl control valve system includes a high swirl section at medium or low speeds at which the system closes valves for four of the eight ports in the intake system. The swirl control valve system also includes a flow-increasing section at high speeds at which the system fully opens all of the eight ports in the intake system.

However, common swirl control valve systems do not include logic for reducing surge noise created during Tip Out, i.e. the accelerator pedal is suddenly released from a depressed position to a nearly or completely released position.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention provide a method and system of controlling a swirl control valve that fully opens a swirl control valve during Tip Out so as to effectively reduce surge noise created in a swirl control valve system for diesel vehicles having a four-valve diesel engine.

An exemplary method includes determining whether a current engine condition is in Tip Out by detecting positions of a VGT vanes and an EGR valve, for example, if both positions of the VGT vanes and the EGR valve are fully opened, it is determined that the present condition is in Tip Out. If it is determined that the current condition is in Tip Out, the swirl control valve is fully opened. If it is determined that the current condition is not in Tip Out, the swirl control valve is not opened.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Hereinafter, a preferred embodiment of the present invention will be described in detail with reference to the accompanying drawings.

Figure 1:
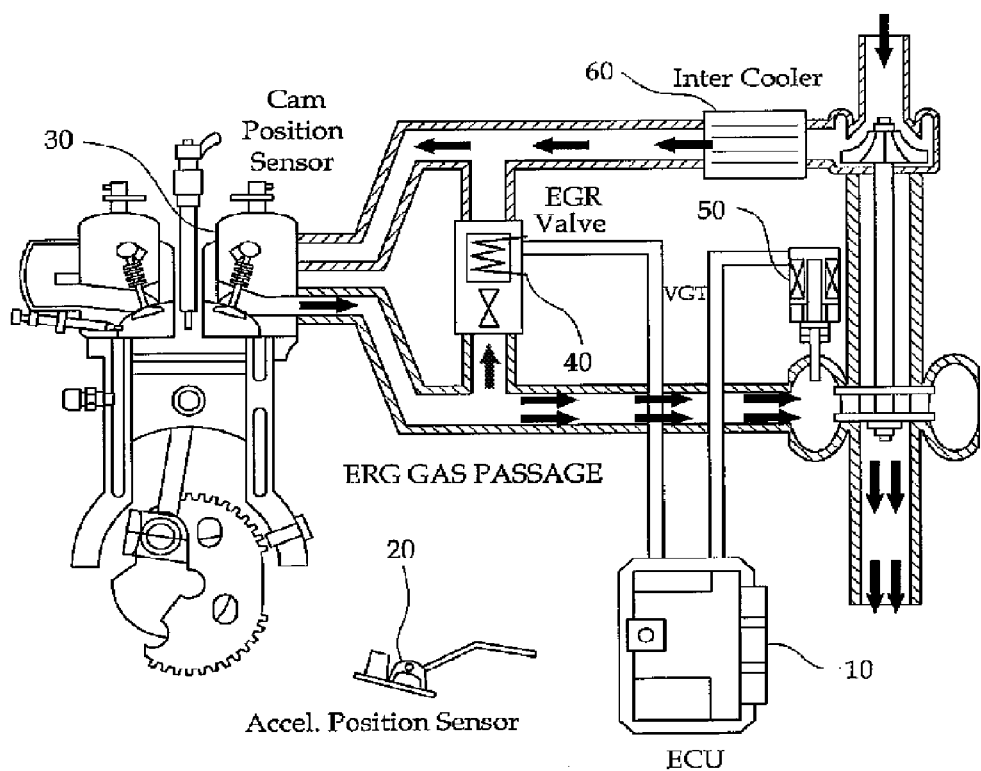
FIG. 1 is a schematic diagram showing the configuration of a diesel vehicle to which the present invention can be applied.
Figure 2:
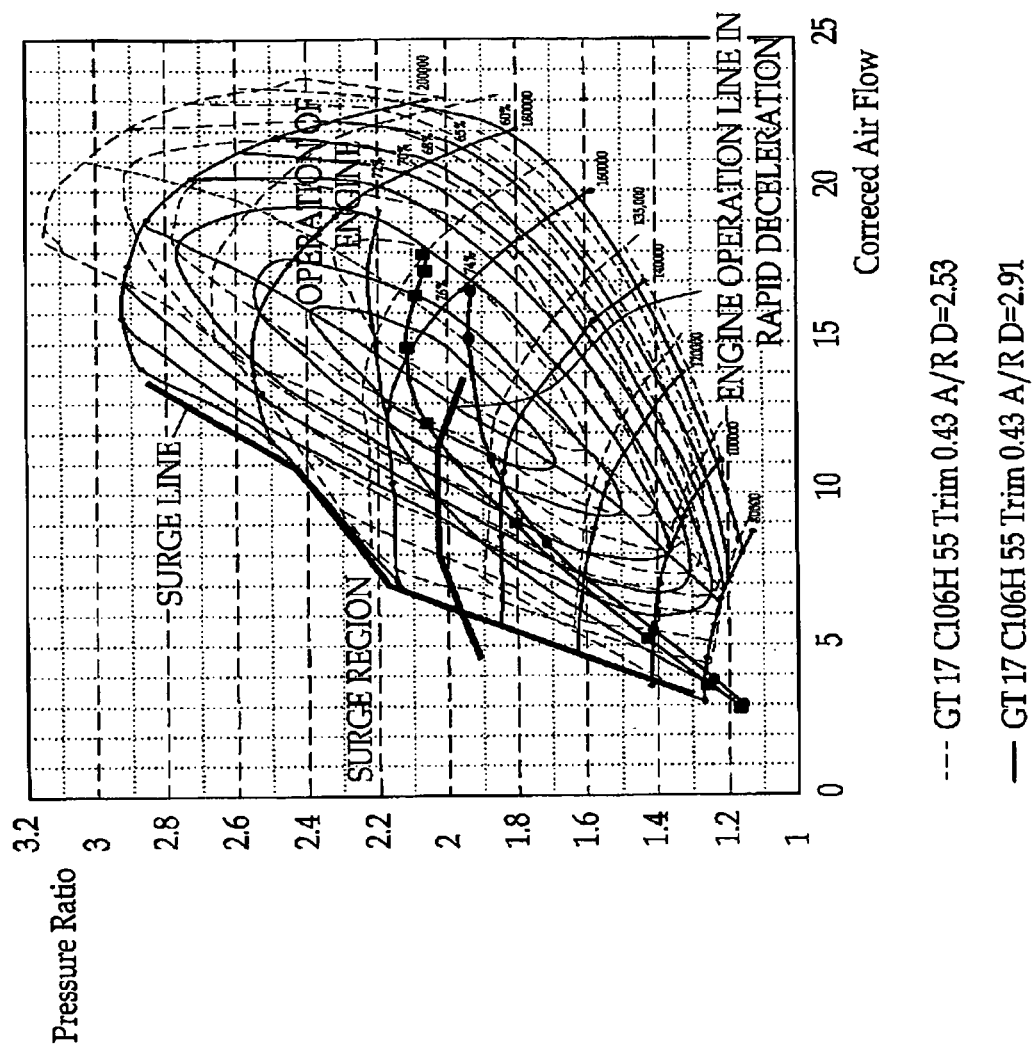
FIG. 2 is a view showing a region where turbo surge occurs.

A method of controlling a swirl control valve according to an embodiment of the present invention can be applied to an ECU (Electronic Control Unit) 10 of a diesel vehicle such as that shown in FIG. 1. The vehicle may include the ECU 10, an accelerator position sensor 20, a cam position sensor 30, an EGR (Exhaust Gas Recirculation) valve 40, VGT (Variable Geometry Turbocharger) vanes 50, and an intercooler 60. ECU 10 may include a processor, memory, and associated hardware, software, and/or firmware as may be selected and programmed by a person of ordinary skill in the art based on the teachings herein.

Figure 3:
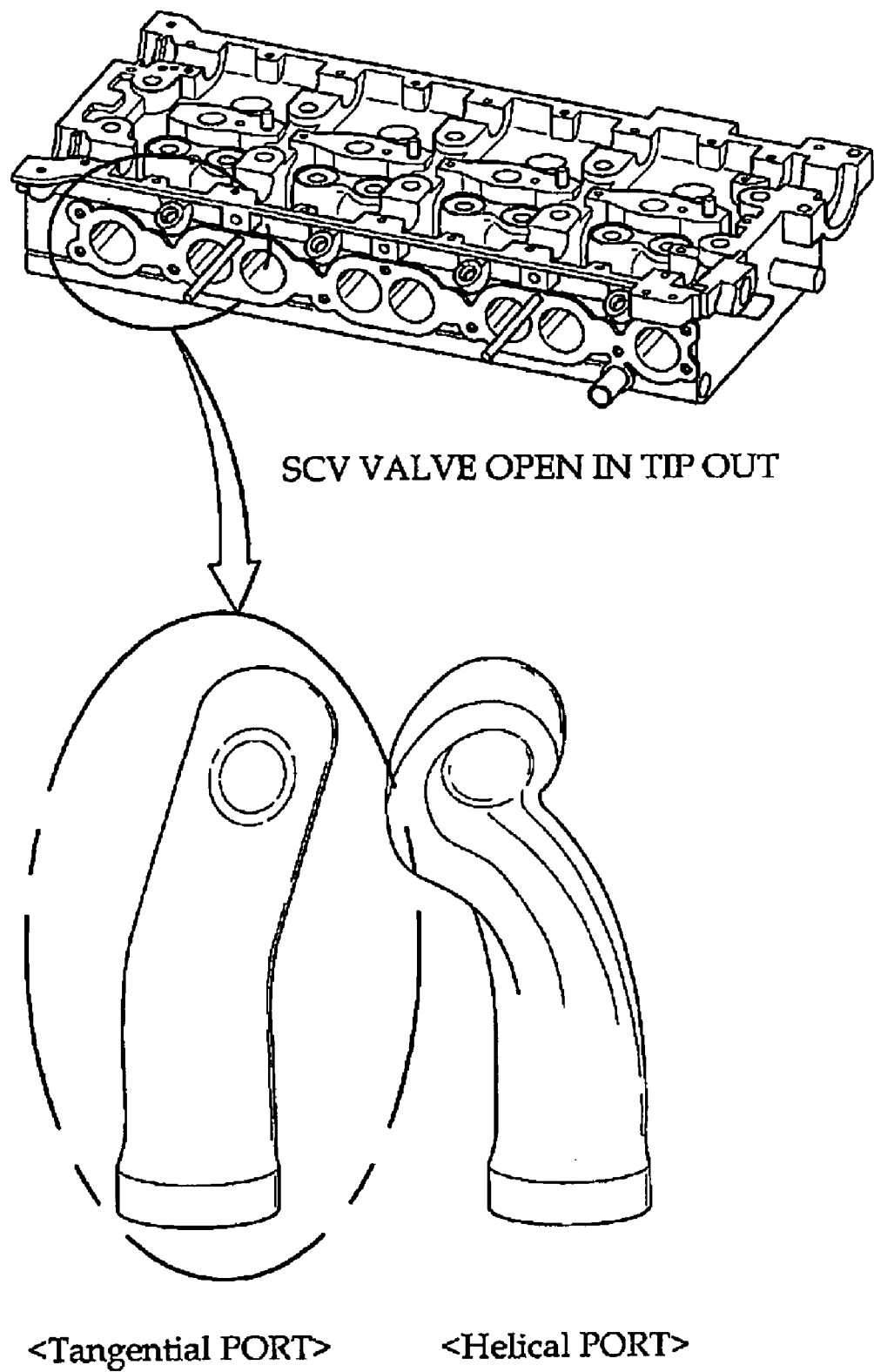
FIG. 3 is a view showing a part of a swirl control valve system to which the present invention can be applied.

As shown in FIG. 3, a swirl control valve is fully opened in Tip Out to increase the volume for four ports, thereby reducing surge noise. For example, as shown in FIG. 3, when the swirl control valve is fully opened in Tip Out, the volume is increased as much as the volume of four tangential ports, so that the pressure in an intake system is decreased and surge noise is reduced.

Figure 4:
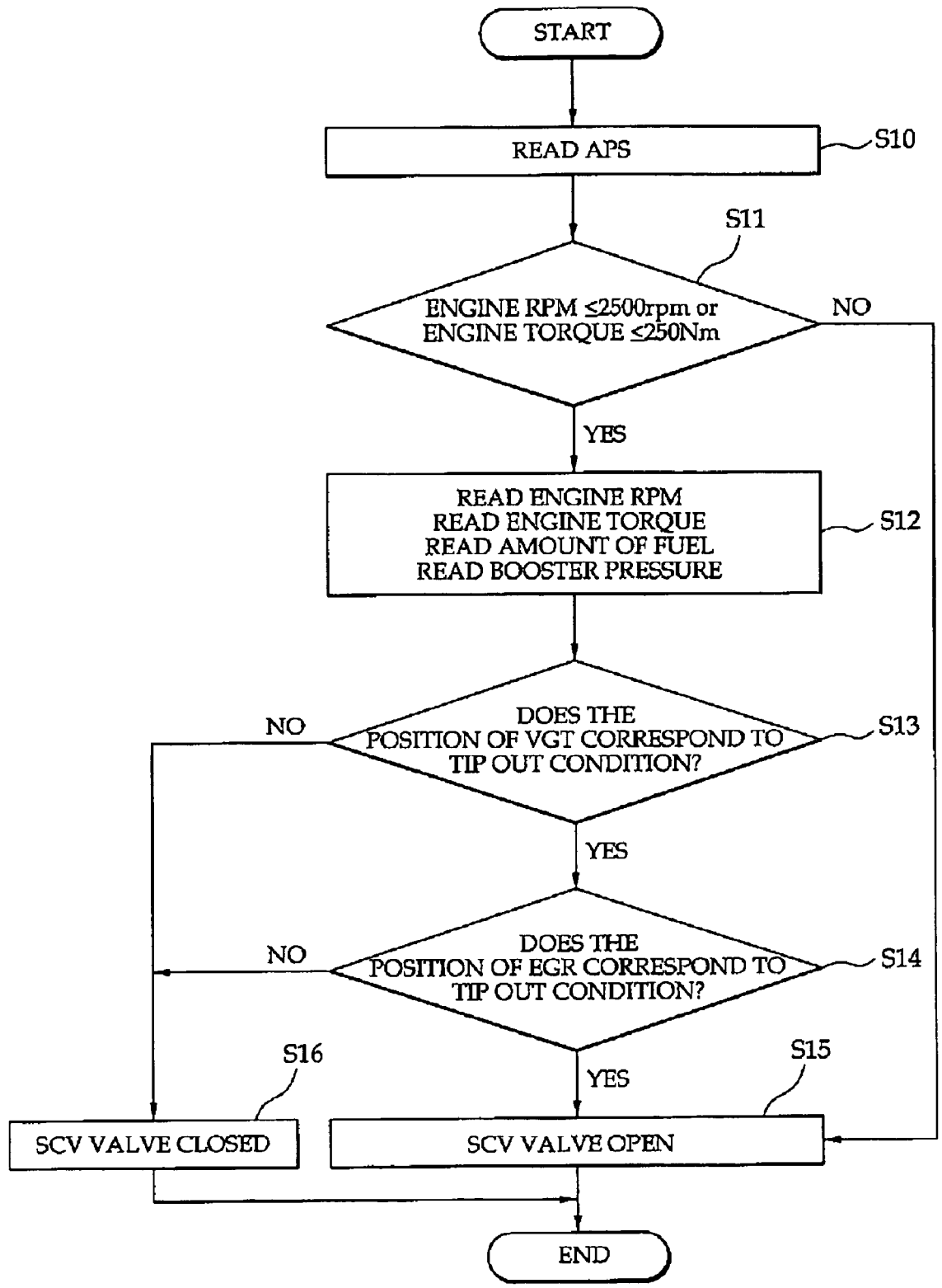
FIG. 4 is a flowchart showing a method of controlling a swirl control valve according to an embodiment of the present invention.

Referring to FIG. 4, ECU 10 reads an accelerator position detected by the accelerator position sensor 20 (S10).

If the accelerator position corresponds to Pedal Off, ECU 10 examines the engine RPM and torque. If the current engine RPM is less than a set value, for example 2500 rpm, or the current engine torque is less than a set value, for example 250 Nm (S11), ECU 10 reads the engine RPM, engine torque, amount of fuel, and booster pressure (S12).

If the position of the VGT vanes 50 corresponds to Tip Out condition (S13) and the position of the EGR valve 40 also corresponds to the Tip Out condition (S14), ECU 10 determines that the current condition is in Tip Out. One will appreciate that the ECU 10 may obtain information regarding the positions of the VGT vanes 50 and the EGR valve 40 from sensors commonly provided within the vanes 50 and the valve 40, which may be of any known or desired construction. Thereafter, as described above referring to FIG. 3, ECU 10 fully opens the swirl control valve to reduce the pressure in the intake system (S16). As a result, surge noise is reduced.

Figure 5:
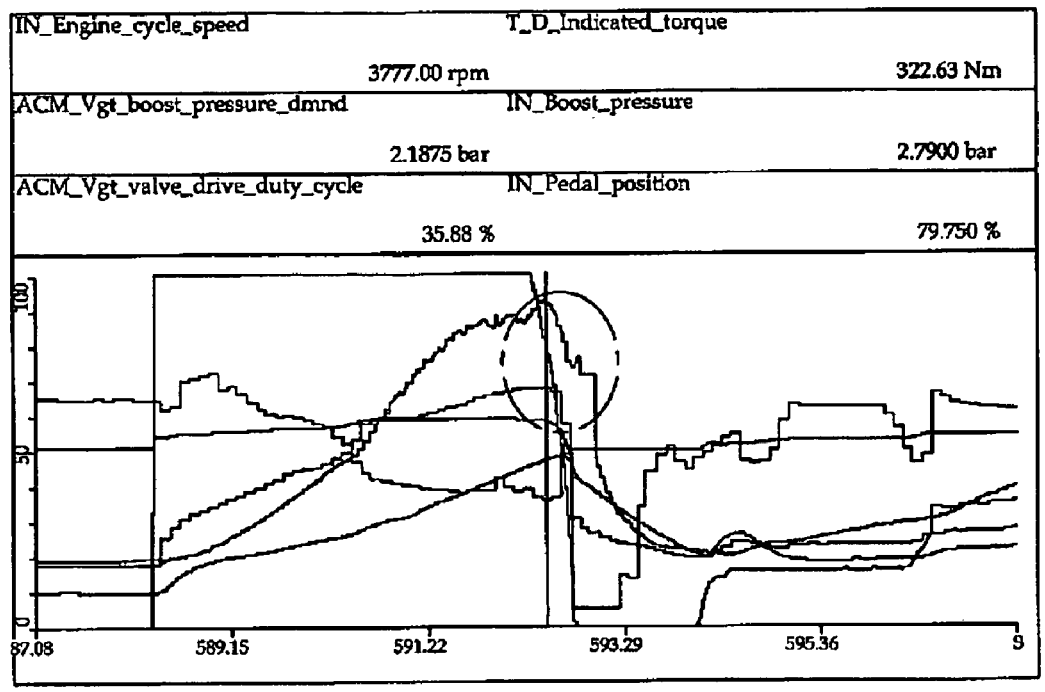
FIGS. 5 and 6 are views showing results of a test where an embodiment of the present invention is applied.
Figure 5:
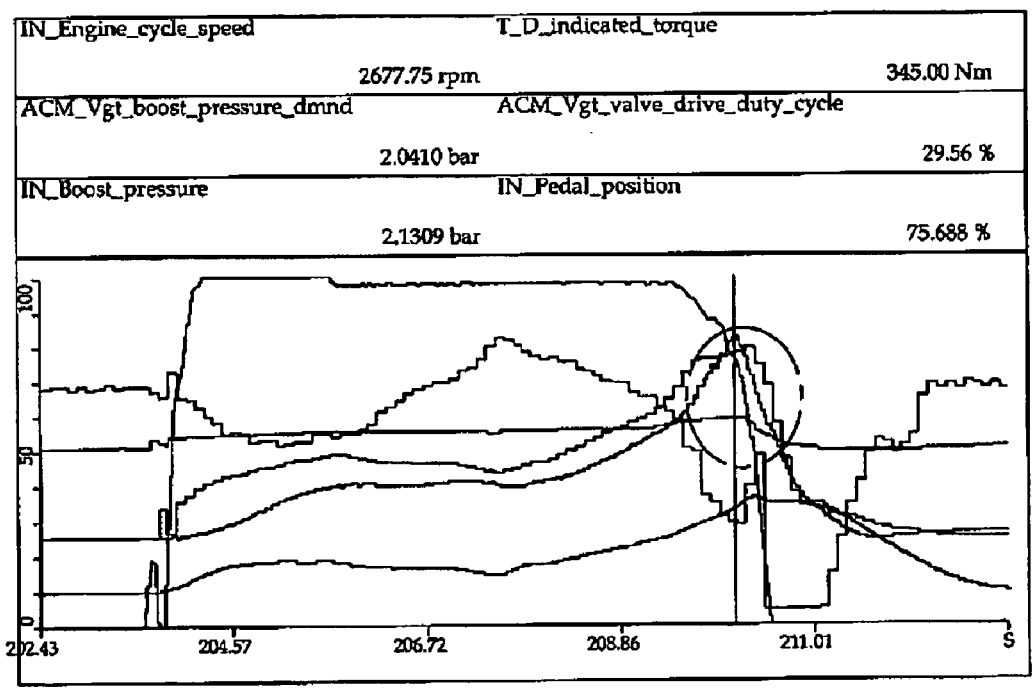

Further, if the position of VGT vanes 50 does not correspond to the Tip Out condition or the position of EGR valve 40 does not correspond to the Tip Out condition, ECU 10 keeps the swirl control valve closed (S16). As shown in FIG. 5, when the swirl control valve is fully closed, the pressure in the intake system is not rapidly reduced. For this reason, surge is caused by the booster pressure (indicated by a circular marking).

Figure 6:
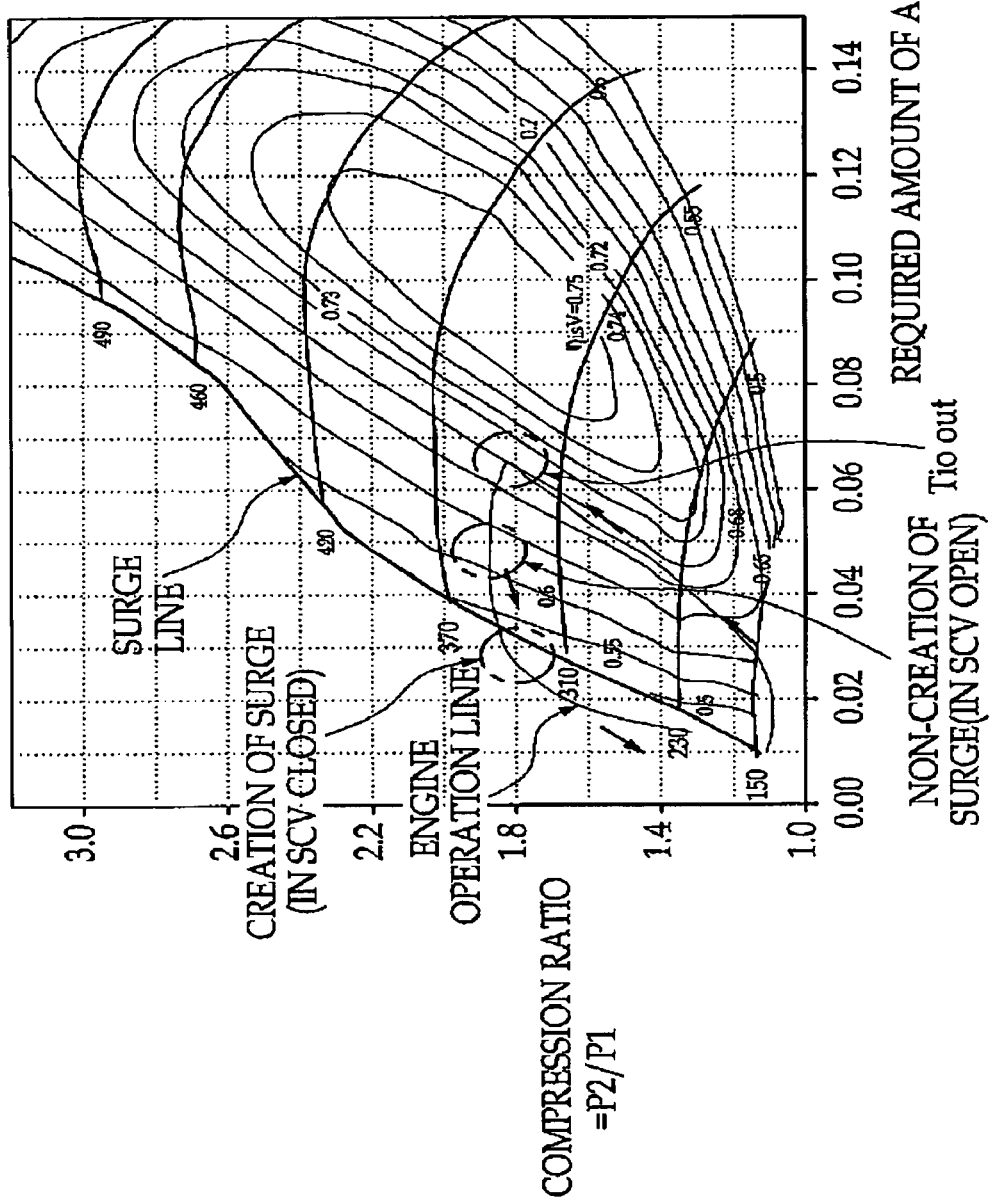

In contrast, when the swirl control valve is fully opened, the pressure in the intake system is rapidly reduced. Accordingly, the surge due to booster pressure is not created. As shown in FIG. 6, when the present invention is applied to the swirl control valve system, surge is not created in Tip Out due to the opening of the swirl control valve.

According to the preferred embodiments of the present invention as described above, when the swirl control valve is fully opened in Tip Out, the volume is increased in four ports. Accordingly, the pressure in an intake system is reduced, so that surge noise can be effectively reduced. As a result, it is possible to obtain advantages of improving silence of a vehicle and satisfaction of a driver.

Although the preferred embodiments of the present invention have been disclosed for illustrative purposes, those skilled in the art will appreciate that various modifications, additions and substitutions are possible, without departing from the scope and spirit of the present invention as disclosed in the accompanying claims.

What is claimed is:

1. A method of controlling a swirl control valve, comprising:
    determining whether a current condition is in Tip Out based on positions of VGT vanes and an EGR valve, wherein the determining comprises, if both the VGT vanes and the EGR valve are fully opened, determining that the current condition is in Tip Out;
    fully opening the swirl control valve if it is determined that the current condition is in Tip Out; and
    not opening the swirl control valve if it is determined that the current condition is not in Tip Out.

2. The method as defined in claim 1, wherein the determining further comprises, if either of the VGT vanes or the EGR valve is not fully opened, determining that the current condition is not in Tip Out.

3. The method as defined in claim 1, wherein the determining further comprises, if an engine speed is above a set value, determining that the current condition is in Tip Out.

4. The method as defined in claim 3, wherein the set value is approximately 2500 RPM.

5. The method as defined in claim 1, wherein the determining further comprises, if an engine torque is above a set value, determining that the current condition is in Tip Out.

6. The method as defined in claim 5, wherein the set value is approximately 250 Nm.

7. A swirl control valve system, comprising:
    VGT vanes;
    an EGR valve;
    a swirl control valve; and
    a control unit that determines whether a current condition is in Tip Out positions of the VGT vanes and the EGR valve, wherein if both the VGT vanes and the EGR valve are fully opened and position of accelerator corresponds to Pedal OFF, the current condition is determined to be in Tip Out; and that controls the swirl control valve to open if it is determined that the current condition is in Tip Out, and not to open if it is determined that the current condition is not in Tip Out.

* * * * *